United States Patent
Graas

[19]

[11] Patent Number: 5,957,179

[45] Date of Patent: *Sep. 28, 1999

[54] PNEUMATIC TIRE HAVING IMPROVED WET TRACTION

[75] Inventor: Maurice Graas, Luxembourg, Belgium

[73] Assignee: The Goodyear Tire & Rubber Company, Akron, Ohio

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/605,388

[22] Filed: Feb. 23, 1996

Related U.S. Application Data

[63] Continuation-in-part of application No. 08/147,503, Nov. 3, 1993, abandoned.

[51] Int. Cl.⁶ .............................. B60C 11/03; B60C 11/13; B60C 101/00; B60C 115/00
[52] U.S. Cl. ................................. 152/209.14; 152/209.24; 152/209.26; 152/208.28
[58] Field of Search .......................... 152/209 R, 209 D, 152/209.14, 209.15, 209.24, 209.26, 209.28

[56] References Cited

U.S. PATENT DOCUMENTS

| | | | |
|---|---|---|---|
| D. 329,032 | 9/1992 | Maxwell et al. | D12/147 |
| D. 344,918 | 3/1994 | Graas | D12/147 |
| 1,664,352 | 3/1928 | Coleman | 152/209 R |
| 2,161,445 | 12/1939 | Ball et al. | 106/23 |
| 3,673,136 | 6/1972 | Buchanan et al. | 260/17.4 |
| 3,682,220 | 8/1972 | Verdier | 152/209 D |
| 4,244,415 | 1/1981 | Peter et al. | 152/209 R |
| 4,284,115 | 8/1981 | Ohnishi | 152/209 R |
| 4,456,046 | 6/1984 | Miller | 152/209 R |

(List continued on next page.)

FOREIGN PATENT DOCUMENTS

| | | | |
|---|---|---|---|
| 0296605 | 6/1988 | European Pat. Off. . | |
| 0391300 | 10/1990 | European Pat. Off. | 152/209 D |
| 503404 | 9/1992 | European Pat. Off. | 152/209 R |
| 0594380A1 | 7/1993 | European Pat. Off. . | |
| 0593288A1 | 10/1993 | European Pat. Off. . | |
| 4444970A1 | 12/1993 | European Pat. Off. . | |
| 0659593A1 | 6/1995 | European Pat. Off. . | |
| 0661182A2 | 7/1995 | European Pat. Off. . | |
| 0677405A1 | 10/1995 | European Pat. Off. . | |
| 0710577A1 | 5/1996 | European Pat. Off. . | |
| 819836 | 6/1936 | France . | |
| 819836 | 10/1937 | France | 152/209 R |
| 2608516 | 6/1988 | France | 152/209 R |
| 606754 | 1/1935 | Germany | 63/19 |
| 3643046 | 6/1988 | Germany | 152/209 R |
| 61-166708 | 7/1986 | Japan . | |
| 42306 | 2/1991 | Japan | 152/209 D |
| 132402 | 6/1991 | Japan | 152/209 R |
| 3-246104 | 11/1991 | Japan | 152/209 R |
| 2221877 | 2/1990 | United Kingdom | 152/209 R |

OTHER PUBLICATIONS

Society of Automotive Engineers, Inc. (article), National Automobile Engineerig Meeting May 22–26, 1972.
Smithers Scientific Services, Inc., random footprints 1985–1989.
"Tire Business", p. 38, Sep. 6, 1993.

*Primary Examiner*—Steven D. Maki
*Attorney, Agent, or Firm*—David E Wheeler

[57] ABSTRACT

A directional pneumatic tire having improved wet traction has an annular aqua channel and lateral grooves which direct water from the footprint to the shoulder area of the tire to help prevent hydroplaning. The aqua channel has an extended U-shape wherein one wall of the aqua channel has a steeper incline than the other side of the aqua channel. In a preferred embodiment, the aqua channel may have a step between its shoulder side and its center side wherein the center side is higher by a distance d. In one illustrated embodiment, a center tread portion of the tire, bounded by an aqua channel and a center groove, and two lateral grooves, comprises a single block element.

1 Claim, 5 Drawing Sheets

U.S. PATENT DOCUMENTS

| | | | |
|---|---|---|---|
| 5,116,667 | 5/1992 | Zimmerman et al. | 438/220 |
| 5,176,766 | 1/1993 | Landers et al. | 152/209 R |
| 5,222,537 | 6/1993 | Saito et al. | 152/209 R |
| 5,299,612 | 4/1994 | Saito et al. | |
| 5,327,952 | 7/1994 | Glover et al. | 152/209 R |
| 5,337,815 | 8/1994 | Graas | 152/209 R |
| 5,343,918 | 9/1994 | Fontaine | 152/209 R |
| 5,435,365 | 7/1995 | Tanaka | 152/209 A |
| 5,450,885 | 9/1995 | Hanya | 152/209 R |
| 5,595,619 | 1/1997 | Tanaka | 152/209 A |
| 5,810,953 | 9/1998 | Tanaka et al. | 152/209 R |

PNEUMATIC TIRE HAVING IMPROVED WET TRACTION

This is a Continuation-in-Part of application Ser. No. 08/147,503, filed on Nov. 3, 1993, now abandoned.

BACKGROUND OF THE INVENTION

The invention relates to pneumatic tires which have improved wet traction and handling characteristics.

Hydroplaning of tires on wet pavement has long been a problem in the prior art. Hydroplaning is caused by a tire, when running on wet pavement, because the tire pushes water in front of it as it advances, until the back pressure of the water is sufficient to lift the tire off the road. The pressure of the water is a function of the depth of the water and the speed of the tire. Various tire designs, adapted to channel water away from the tire, and thereby maintain rubber contact with the road, have been tried by the prior art to correct this problem. Although prior art rain tire designs have improved wet traction, it is a continuing goal in the art to further improve wet traction.

It is an object of the present invention to provide a pneumatic tire having improved wet traction while having good handling, improved noise and improved irregular wear characteristics.

Other objects of the invention will be apparent from the following description and claims.

DEFINITIONS

"Aqua Channel" refers to an extra wide circumferential groove with angled (non parallel), rounded groove walls designed specifically to channel water out of the footprint contact patch of the tire.

"Aspect Ratio" of the tire means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Contact Patch" refers to a section of footprint, in a footprint that is divided into sections by wide void areas, that maintains contact with the ground.

"Crown" refers to the circumferentially outermost portion of the carcass substantially within the width limits of the tread.

"Directional tread" refers to a tread design which has a preferred direction of rotation in the forward direction of travel.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint. Circumferentially and laterally extending grooves sometimes have common portions and may be subclassified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Lugs" refer to discontinuous radial rows of tread rubber in direct contact with the road surface.

"Net-to-gross" refers to the ratio of the ground contacting surface of a tread to the total tread area.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Pneumatic tire" means a laminated mechanical device of generally toroidal shape (usually an opentorus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Shoulder" refers to the upper portion of sidewall just below the tread edge.

"Sidewall" means that portion of a tire between the tread and the bead.

"Sipes" refer to small slots molded into ribs of a tire that subdivide the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

SUMMARY OF THE INVENTION

A pneumatic tire for use on paved surfaces is provided which comprises a pair of annular beads, carcass plies wrapped around the beads, a tread disposed over the carcass plies in a crown area of the tire, and sidewalls disposed between the tread and the beads. The tread is directional and has a net-to-gross ratio of 42% to 70% and two annular aqua channels each having a width of about 10% to 20% of total treadwidth based on the footprint of the tire. The aqua channels have a depth of 78% to 100% of the total tread depth. Shoulder lateral grooves, being defined as the lateral grooves between an aqua channel and a shoulder of the tire, are disposed having a first end in a leading part of the tread pattern nearer the aqua channel than a shoulder, and a second end in a trailing part of the tread pattern nearer a shoulder than an aqua channel. Center lateral grooves, being defined as lateral grooves between aqua channels, have a first portion in a leading part of the tread pattern closer to a center of the tire than to an aqua channel and a second portion in the trailing part of the tread pattern closer to an aqua channel than to the center of the tire.

Different illustrated embodiments of the tire have a circumferential groove at the equatorial plane (EP) of the tire or a rib at the EP of the tire.

Various combinations of skewing between the center lateral grooves and shoulder lateral grooves, and skewing between shoulder lateral grooves and center lateral grooves, improve the noise, and possibly, the traction properties of the tire.

In one embodiment, the shoulder portions or lugs of the tire, bounded by lateral grooves, the shoulder and an aqua channel, comprise a single block element. In another embodiment, center tread portions or lugs, bounded by both aqua channels, comprise a single block element. Tires wherein the lateral and central blocks are divided by circumferential grooves are also provided. Tires having various combinations of the above features are also provided.

The aqua channels have an extended U-shape where one wall of the aqua channel has a steeper incline than the other wall. In an illustrated embodiment, a wall of the aqua channel closer to a shoulder has a steeper incline than the side of the aqua channel closer to the center of the tire.

In a preferred embodiment, there is a step in the bottom of the aqua channel between the shoulder side and the center side. In an illustrated embodiment, the center side of the step is higher than the shoulder side by a distance d.

The center of the tire may be extended radially outward to induce more pressure on the center portion of the tire.

The aqua channel and the lateral grooves provide a means for expelling large volumes of water from the tire footprint contact patch.

DETAILED DESCRIPTION OF THE INVENTION

Figure 1:
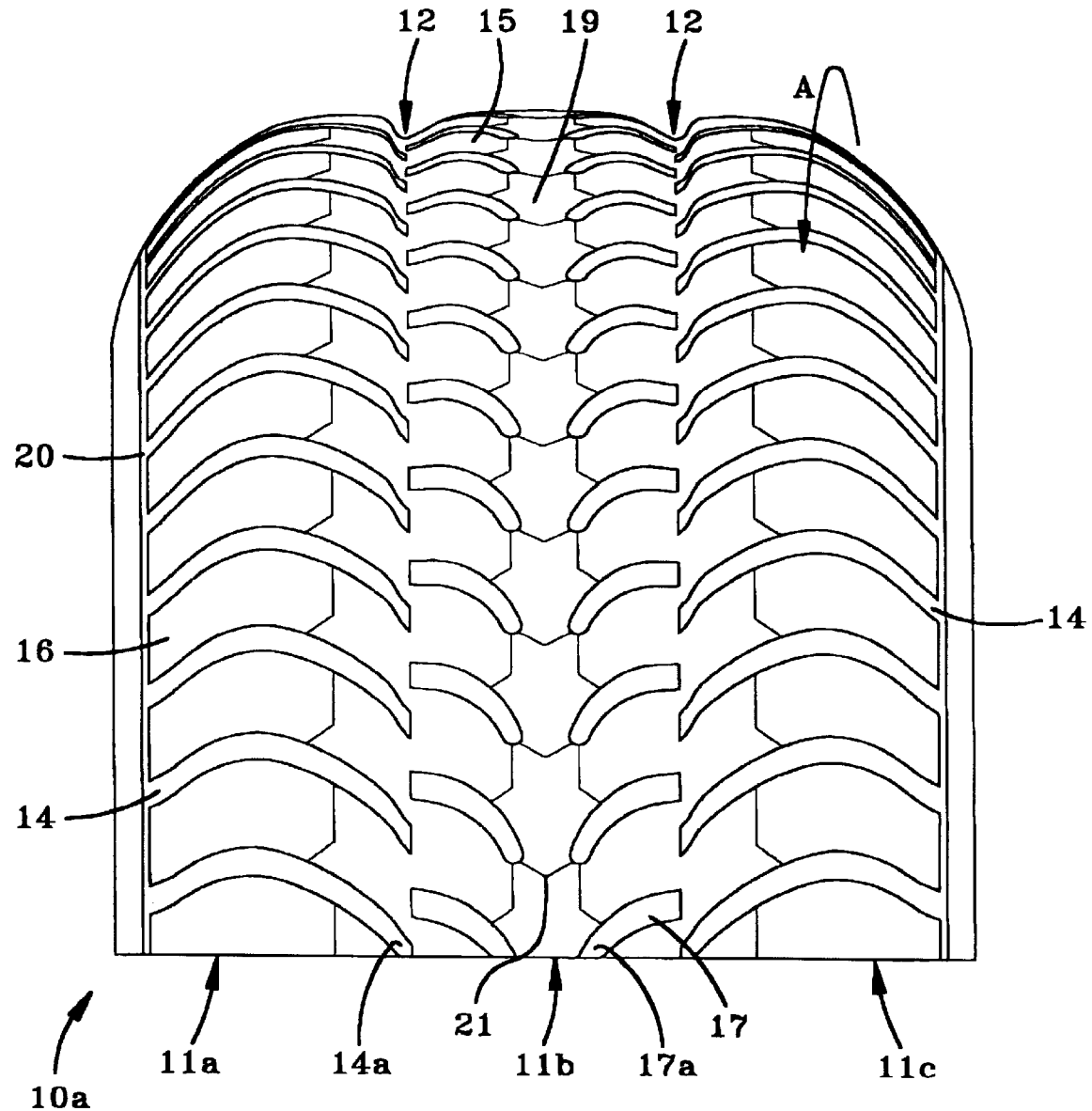
FIG. 1 is a frontal view of one embodiment of a tire of the invention.

With reference now to FIG. 1, tire 10a has a tread portion 11 which is divided into three circumferentially extending parts, 11a, 11b and 11c by aqua channels 12. Curved lateral grooves 14 initiate in aqua channels 12 and take an uninterrupted slanted or arcuate path to shoulder 20. Curved lateral grooves 17 (in center tread portion 11b) initiate in aqua channels 12 and end in center rib portion 19. The aqua channels 12 intersect lateral grooves 17 and 14, respectively, forming center lugs 15 and shoulder lugs 16.

When driving on wet roads, wherein the tire rotates in the direction of arrow A, the presence of the lateral grooves in the aqua channel substantially facilitates the flow of water out of the contact patch of the tire footprint. Shoulder lateral grooves 14 direct water out of the shoulder of the tire, and central lateral grooves 17 direct water from the center of the tire to the aqua channels 12. This mechanism helps prevent water back pressure from building up in front of the tire, and helps maintain rubber contact between the tire and the pavement.

The tread of the tire of the invention is directional since, if the tire is mounted such that a portion 14a, 17a of the lateral groove in the shoulder of the tire, or a center of the tire, respectively, enters the footprint last, water would be channeled toward, instead of away from the center of the tire.

Figure 2:
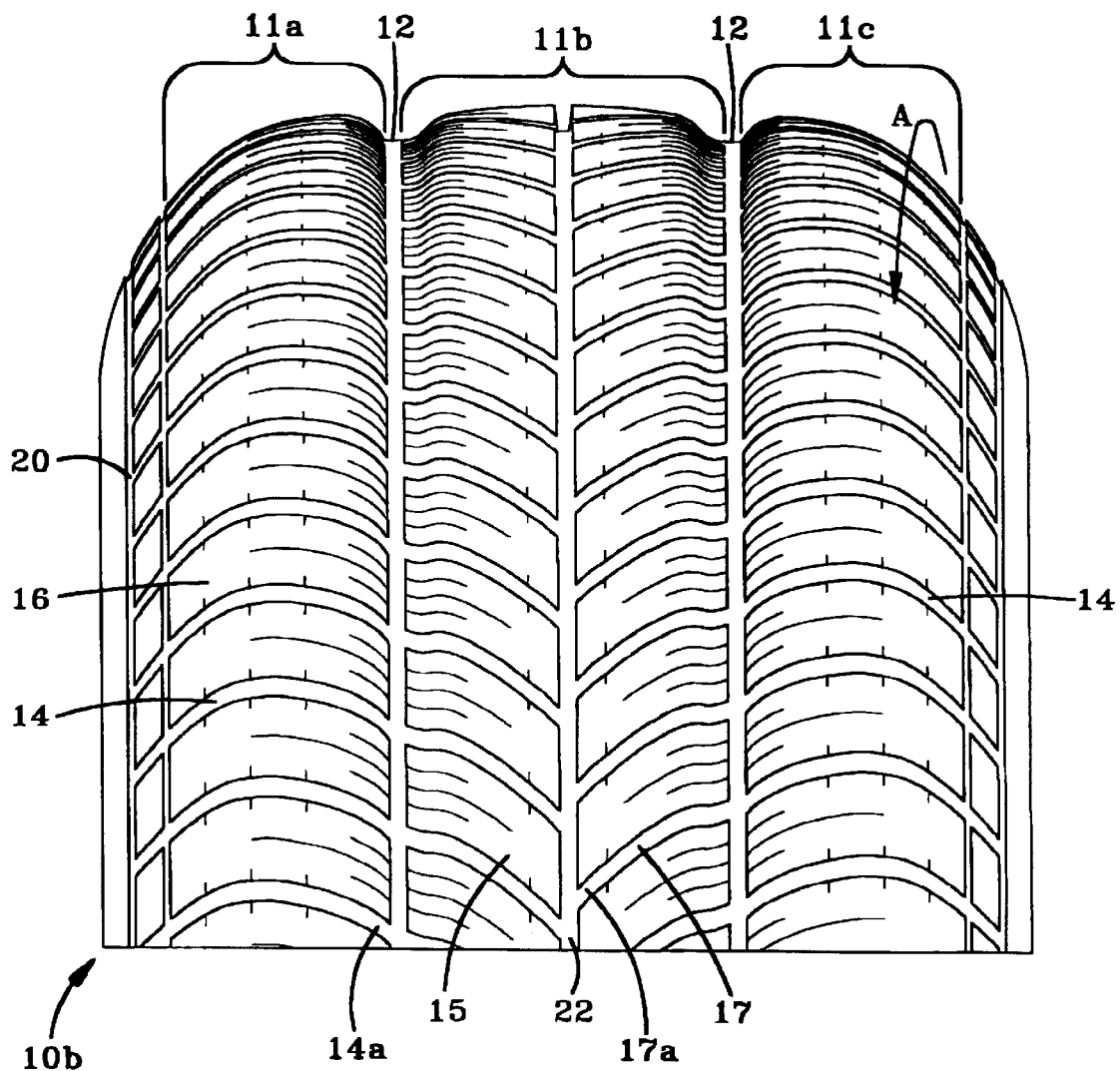
FIG. 2 is a frontal view of a second embodiment of a tire of the invention.

In an alternative embodiment, as illustrated in FIG. 2, a tire 10b of the invention may be made with a center groove 22.

Unless otherwise indicated, number designations identifying specific portions of a tire will be consistent throughout the drawings.

A tire made with a center groove has the advantages that there is a decoupling between the portions of the tire on either side of the equatorial plane of the tire (the center groove) which may make the ride smoother when the tire passes over a stone. Also, a center groove helps dissipate heat. Also, designs providing for skewing between the two tread portions (in order to improve noise properties) are more easily facilitated if skewing takes place around a groove.

The tires with a center rib (FIG. 1 and FIG. 3) have the advantages that the tire, since most of the pressure is on the center of the tire, has a continuous, pressure bearing locus of points in contact with the road. This reduces noise and causes a smoother ride on smooth pavement. While the rib may be bladed (to contain sipes) to increase grip, reduce heat build up and to provide a pleasing design, blading is not believed to be necessary in a narrow center rib.

A pneumatic tire for use on paved surfaces of the invention comprises a pair of annular beads, carcass plies wrapped around the beads, a tread disposed over the carcass plies in a crown area of the tire, and sidewalls disposed between the tread and the beads. The tread is directional and has a net-to-gross ratio of 42% to 70% and two annular aqua channels each having a width of about 10% to 20% of total treadwidth based on the footprint of the tire. The aqua channels have a depth of 78% to 100% of the total tread depth. Shoulder lateral grooves, being defined as the lateral grooves between an aqua channel and a shoulder of the tire, are disposed having a first end in a leading part of the tread pattern nearer the aqua channel than a shoulder, and a second end in a trailing part of the tread pattern nearer a shoulder than an aqua channel. Center lateral grooves, being defined as lateral grooves between aqua channels, have a first portion in a leading part of the tread pattern closer to a center of the tire than to an aqua channel and a second portion in the trailing part of the tread pattern closer to an aqua channel than to the center of the tire.

As is apparent from the drawings, the lateral grooves make substantially a "V" shape around the EP of the tire.

In a preferred embodiment, as illustrated in FIGS. 1 and 2, the center lateral grooves 17 will have an angle of 20°–60° (or –20° to –60° depending on the direction of measurement of the angle along the EP), preferably 35°–45° with respect to the EP of the tire (where the EP is oriented at 90° for the measurement). Shoulder lateral grooves 14 are substantially arcuate and will have an angle of 50° to –50° (–50° to 50° at the opposite shoulder) with respect to the EP, preferably approaching 90° (0° with respect to the geometric orientation of the drawing) at the tread edge.

Various combinations of skewing between the center lateral grooves and shoulder lateral grooves, and skewing between shoulder lateral grooves, and between center lateral grooves, improve the noise, and possibly, the traction properties of the tire. It is preferred that skewing is such that none of the ends of any of the lateral grooves are in lateral alignment.

In one embodiment, the shoulder portions or lugs of the tire, bounded by lateral grooves, the shoulder and an aqua channel, comprise a single block element. In another embodiment, center tread portions or lugs, bounded by both aqua channels, comprise a single block element.

Figure 3:
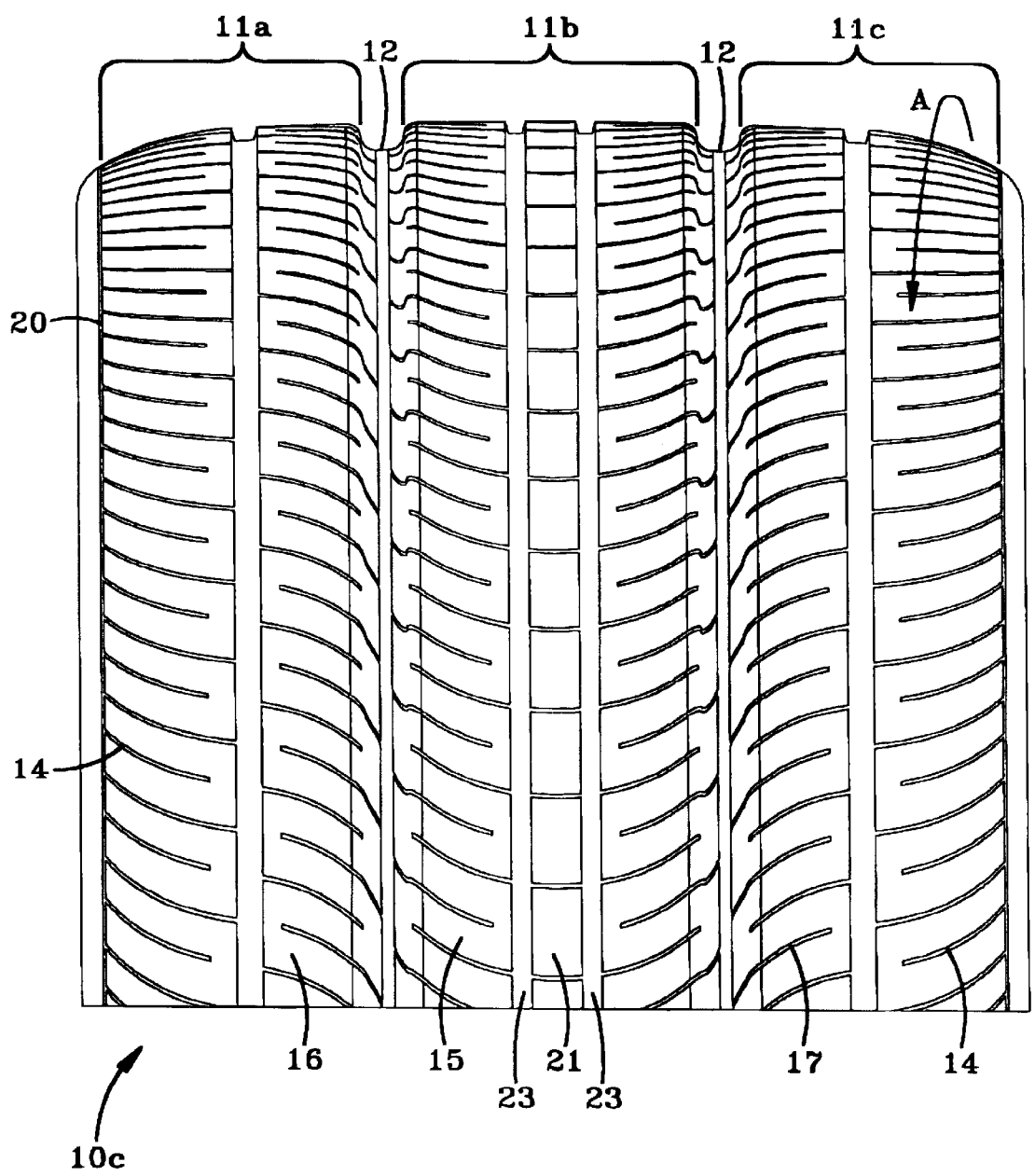
FIG. 3 is a frontal view of a third embodiment of a tire of the invention.

With reference now to FIG. 3, in another alternative embodiment, a tire with a center rib 21 may be provided with two conventional circumferential grooves 23 on either side thereof, in addition to the aqua channels 12. Other conventional circumferential grooves may be deployed in the shoulder portions of the tire. In the illustrated embodiment, the lateral grooves are slightly arcuate and have an angle, with respect to the EP, in the center portion of the tire of substantially 10° to 30°, and in shoulder regions of the tire 10° to 30° toward the center of the tire and 0° to 20° toward the tread edge (wherein the EP is oriented at 90°) and the aquachannels are symmetrical. Although asymmetrical aquachannels are preferred for the designs of FIGS. 1 and 2, symmetrical aquachannels may be used if the overall design of the tire is improved by such an aquachannel.

In one preferred embodiment, the tires of the invention are siped to improve traction and increase the flexibility of the tread. Tread block sipes are preferably parallel to lateral grooves. The siping in the shoulder of the tire extends slightly beyond the tread edge. The sipes are bladed in the shoulder so that short sipes become longer as the tire wears. That is, the sipes are bladed wider under the surface of the tread block.

The tires illustrated herein are high performance tires and have a low aspect ratio, in the range of 0.3 to 0.7, in the illustrated embodiment 0.5 to 0.65, and are wider than conventional street tires, having a width of 175 mm to 315 mm. Since high performance tires are designed for high speeds, the tires are made using an overlay, preferably a spiral overlay, using conventional spiral layups. In a high speed tire, the presence of the tread rubber in the central portion of the tire, between the two aqua channels, is of particular advantage since it provides a locus of points that bears the major portion of the pressure encountered by the tire when running at high speed. The locus of points in the center of the tire provides a smooth ride and provides support against centrifugal forces at the center of the tire.

The aqua channels have an extended U-shape where one wall of the aqua channel has a steeper incline than the opposite wall of the aqua channel. In the illustrated embodiment, the wall of the aqua channel closer to a shoulder has a steeper incline than the side of the aqua channel closer to the center of the tire.

It is believed that the shape of the aqua channel provides a means for decoupling the portions of the tire tread separated by the aqua channel. For example, in the illustrated embodiment, since the shoulder wall is steeper than the wall toward the center of the tire tread, the shoulder portion of the tire tread will be more rigid than the center in the proximity of the aqua channel. The inclined wall, however, while being flexible in the area of the aqua channel, buttresses the center of the tire and provides a gradient of support for the central portion of the tread. Accordingly, the shoulder portion of the tire tread is stable and provides good handling properties, and the center of the tread is flexible enough to easily absorb road anomalies and provides a smooth ride.

Figure 4:
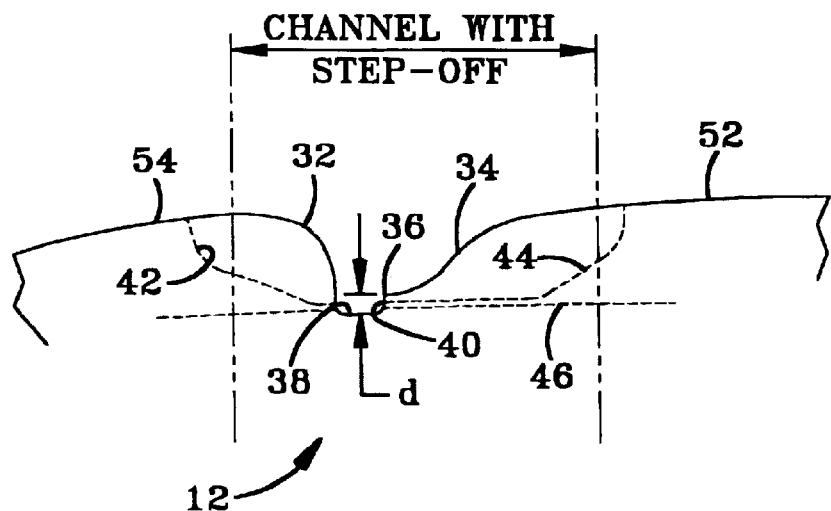
FIG. 4 illustrates a cross section of an aqua channel of the tire.

With reference now to FIG. 4, the aqua channels have a small center groove 38 without siping. Using the bottom D of the center groove as a reference point, the dimensions (d) in the illustrated tire, relative thereto, can be represented as d=1.5 mm for the treadwear indicators, and d=0.6 mm to 1 mm, preferably 0.8 mm for step-off 36. Siping (the bottom of the sipe 40) near the aqua channel is at d=0.5 mm. Accordingly, the aqua channel and siping remain when the tire is worn down to the tread depth indicators. Those skilled in the art will recognize that the specific dimensions will depend on the laws of the specific country in which the tires are sold, and the size of the tire.

The bottom 46 of the lateral grooves is at about the same level as bottom 38 of the aqua channel.

Figure 5:
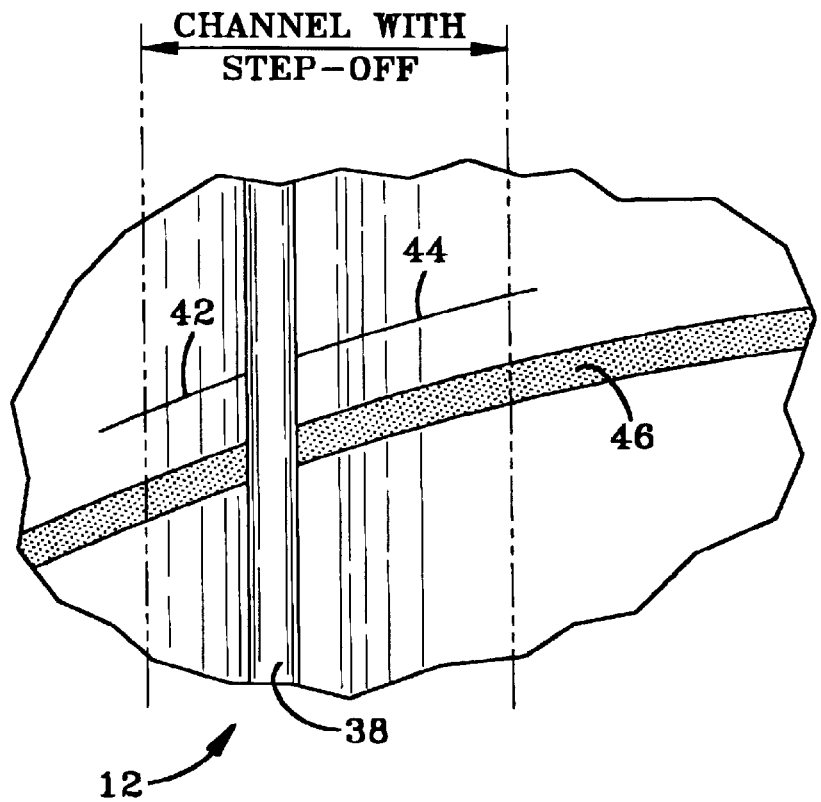
FIG. 5 illustrates a top view of a portion of an aqua channel of the tire.

As can be seen in FIGS. 4 and 5, the profile of the blade depth 44 in the rubber block (near the aqua channel) is full depth 40 for half of the block length and then takes the profile shown in the drawings. Blade depth 42 shows a slight incline toward the shoulder of the tire in the profile shown. The ratio of (sipe length)/(sipe length+unsiped block length) is relatively constant over most of the life of the tire. It is believed that these features help maintain traction properties relatively constant over the life of the tire.

The width of the aqua channel at the tread surface is about 2–5 cm, depending on the design and the size of the tire. For instance, in the illustrated embodiment, a size 175/70 tire has an aqua channel width of 2 cm, and a 235/50 size tire has an aqua channel width of 5 cm.

In the illustrated embodiment, the aquachannels are substantially evenly spaced axially in the tread so that in the footprint, each contact patch comprises a similar portion of the footprint. Specifically, each contact patch comprises 15% to 30% of the footprint width.

As discussed above, shoulder wall 32 of the aqua channel 12 has a steeper incline than center wall 34. Center wall 34 has an inflection point at about 35% to 70%, preferably 50%, of the tread depth of the tire.

Figure 6:
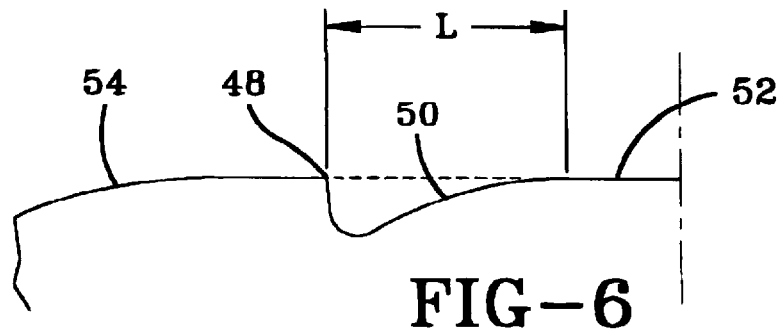
FIG. 6 illustrates an alternative aqua channel of the tire.
Figure 7:
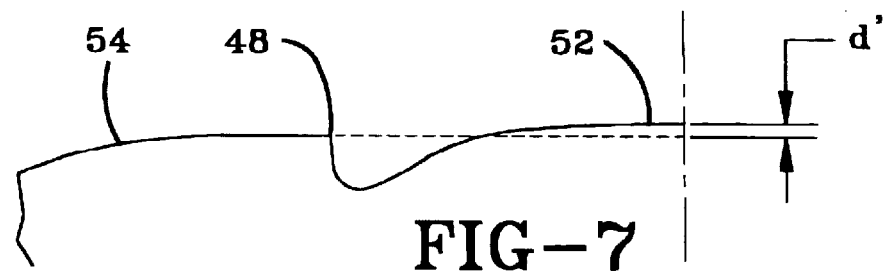
FIG. 7 illustrates a third embodiment of the tire showing an extended center portion.
Figure 8:
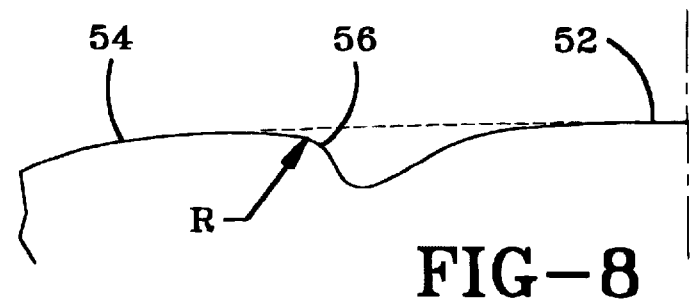
FIG. 8 illustrates an alternative aqua channel having radiused walls.
Figure 9:
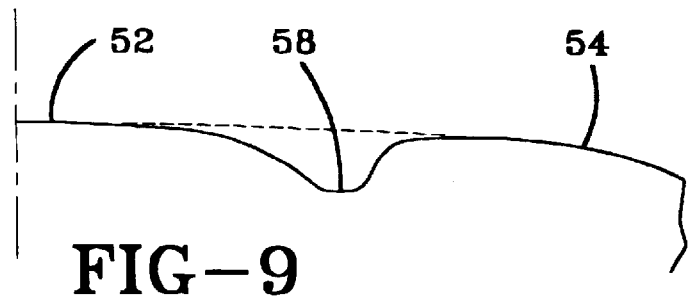
FIG. 9 illustrates an alternative aqua channel having a flattened bottom.

FIGS. 6–9 illustrate alternative profiles for the shape of an aqua channel. In these Figures, it is also seen that the aqua channel may be provided without a step off. The shoulder lug 54 and the center lug 52 may have a variety of shapes relative to aqua channel 12. For example, FIG. 6 shows a sharp lug edge 48 on lug 54 and a convex shaped channel wall 50 leading into lug 52. FIG. 8 shows a radius 56 on lug 54 and FIG. 9 shows an aqua channel with sharp corners at bottom 58.

In FIG. 7, lug 54 has a sharp corner 48 but has a center lug 52 which is radially extended in the center by a distance 56. In such an embodiment, the center lug 52 can be extended up to 10% based on the thickness of the tread, preferably 4% to 6% radially outward over the shape of the tire shown in the other figures (i.e. substantially 10%, preferably 4% to 6% of the tread thickness radially outward over what would be expected based on the contour of the shoulders of the tire). It is believed that the shape of the tire and the added pressure in the center of the footprint of the tire improves rolling resistance while maintaining traction properties.

The tread has a designed total net-to-gross ratio of 45% to 70%, preferably 45% to 60%. In the part of the tread that touches the road (the contact patch) (i.e. the footprint excluding the aqua channels), the tread has a net-to-gross ratio of about 60% to 90%, preferably 68% to 80% and in the illustrated embodiments about 73%. In the illustrated embodiment the overall design net-to-gross ratio is about 55%. It is believed that the high traction properties of the tire, even when the overall net to gross is relatively low, is partially attributable to the fact that there is a large amount of rubber in contact with the road in the portions of the tire that contact the road.

The width of each aqua channel 12 may comprise about 10% to 20% of the total tread width based on the footprint width. In the various illustrated embodiments, the width of the aqua channel varies from about 10% to about 20% of the overall tread width.

In a tire footprint of a tire of the invention under design load and pressure, the overall footprint net to gross is about 42% to 70%, preferably about 50 to 65%. In the contact patch, the part of the tire that touches the road (the footprint excluding the aqua channel), the net-to-gross is about 60%–80% preferably 65% to 75%.

The footprint of the illustrated tire of the invention comprises three contact patches. The three contact patches comprise two substantially trapezoidal contact patches oriented longer base to longer base, and a substantially rectangular contact patch, disposed between the two trapezoidal shaped patches. The angular sides of the trapezoidal contact patches make an angle of about 25° to about 55°, preferably 30° to 50°, with respect to a line that traverses an end of the footprint nearest the angular side.

Each of the three contact patches are separated by a void area, corresponding to an aqua channel, that comprises about 10% to about 20% of the width of the tire footprint.

The tire of the invention directs water from in front of the tire because, like the bow of a boat, the leading edge of the footprint pushes water toward the sides of the tire footprint as the tire makes contact with the ground, and because of the shape of the lateral grooves, continues to pump water toward the shoulders of the tire, or into the aqua channels, as the tire continues in its contact through the footprint.

The depth of the aqua channel may comprise 78% to 100%, preferably 82% to 92% of the total tread depth which is about 0.91 cm (0.36 in) in the illustrated embodiment. By total tread depth it is meant the distance from the tread base to the land area of a lug. In the illustrated embodiment the aqua channel depth is about 83% of the total tread depth or about 0.13 cm (0.05 in) less than the total depth. The extended U-(rounded) shape of the channel provides for smooth flow of water into the channel and out of the contact patch of the tire footprint and for improved lateral traction of the tire.

Also, the curvature of the shoulder walls of the extended U of the channel is similar to the curvature of the shoulder of the tire and in effect, provides a second shoulder for gripping the road and providing improved lateral control and handling properties.

While specific embodiments of the invention have been illustrated and described, it will be recognized by those skilled in the art that the invention may be variously modified and practiced without departing from the spirit of the invention. The invention is limited only by the following claims.

What is claimed is:

1. A pneumatic tire for use on paved surfaces comprising a pair of annular beads, carcass plies wrapped around said annular beads, a tread disposed over said carcass plies in a crown area of said tire, and sidewalls disposed between said tread and said beads, wherein said tire under design load and pressure has a footprint and wherein said tread has a directional tread pattern and has a footprint net-to-gross ratio of 42% to 70% and two annular aqua channels each having non-parallel rounded groove walls, said aqua channels each having a width of about 10% to 20% of total tread width based on the footprint of the tire and a depth of 78% to 100% of total tread depth, and wherein shoulder lateral grooves between an aqua channel and a shoulder are disposed at an angle of 90° to 50°, or 90° to −50° with respect to the equatorial plane (EP) of the tire, said shoulder lateral grooves having a first end in a leading part of the tread pattern nearer the aqua channel than the shoulder and a second end in a trailing part of the tread pattern nearer the shoulder than the aqua channel, and wherein center lateral grooves between said aqua channels have an angle of 20° to 60° with respect to the equatorial plane (EP) of the tire, wherein said center lateral grooves have a first portion in the leading part of the tread pattern closer to a center of the tire than to an aqua channel and a second portion in the trailing part of the tread pattern closer to the aqua channel than to the center of the tire and wherein a center groove is located at the equatorial plane (EP) of the tire and said aqua channels each have an extended U-shape wherein one wall of the aqua channel has a steeper incline than the opposite wall of the aqua channel which is closer to the center of the tire, and wherein a thickness of the tread in the center of the tire is 4% to 7% greater than the tread thickness in the shoulders, and wherein said footprint comprises two substantially trapezoidal contact patches oriented longer base to longer base and a substantially rectangular contact patch disposed between the two substantially trapezoidal contact patches, each substantially trapezoidal contact patch is separated from the substantially rectangular contact patch by a void area which corresponds to an aqua channel.

* * * * *